United States Patent
Iio et al.

(10) Patent No.: US 10,227,497 B2
(45) Date of Patent: Mar. 12, 2019

(54) ACTIVE ENERGY RAY CURABLE COMPOSITION, ACTIVE ENERGY RAY CURABLE INK, INKJET INK, STEREOSCOPIC MODELING MATERIAL, ACTIVE ENERGY RAY CURABLE COMPOSITION CONTAINER, TWO-DIMENSIONAL OR THREE DIMENSIONAL IMAGE FORMING APPARATUS, TWO-DIMENSIONAL OR THREE-DIMENSIONAL IMAGE FORMING METHOD, CURED PRODUCT, AND PROCESSED PRODUCT

(71) Applicants: Masato Iio, Kanagawa (JP); Takao Hiraoka, Kanagawa (JP)

(72) Inventors: Masato Iio, Kanagawa (JP); Takao Hiraoka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 113 days.

(21) Appl. No.: 15/205,776

(22) Filed: Jul. 8, 2016

(65) Prior Publication Data

US 2017/0022378 A1 Jan. 26, 2017

(30) Foreign Application Priority Data

Jul. 21, 2015 (JP) ................................. 2015-144094
Mar. 25, 2016 (JP) ................................. 2016-061655

(51) Int. Cl.
| | | |
|---|---|---|
| C09D 4/06 | (2006.01) | |
| B29C 64/124 | (2017.01) | |
| C09D 11/101 | (2014.01) | |
| C09D 11/106 | (2014.01) | |
| B41J 2/01 | (2006.01) | |
| C09D 11/322 | (2014.01) | |
| B33Y 70/00 | (2015.01) | |
| B29K 67/00 | (2006.01) | |

(52) U.S. Cl.
CPC .............. C09D 11/101 (2013.01); B41J 2/01 (2013.01); C09D 4/06 (2013.01); C09D 11/106 (2013.01); C09D 11/322 (2013.01); *B29C 64/124* (2017.08); *B29K 2067/00* (2013.01); *B33Y 70/00* (2014.12)

(58) Field of Classification Search
CPC ... C09D 11/101; C09D 11/102; C09D 11/106; C09D 11/322; C09D 4/06; B29C 64/124
See application file for complete search history.

(56) References Cited

U.S. PATENT DOCUMENTS

| | | | | |
|---|---|---|---|---|
| 8,142,860 | B2 * | 3/2012 | Vanmaele | B41C 1/003 427/514 |
| 2010/0007692 | A1 * | 1/2010 | Vanmaele | B41C 1/003 347/21 |
| 2012/0086762 | A1 | 4/2012 | Noguchi et al. | |
| 2012/0147103 | A1 | 6/2012 | Hasegawa et al. | |
| 2012/0176456 | A1 | 7/2012 | Maekawa et al. | |
| 2012/0200648 | A1 | 8/2012 | Hiraoka et al. | |
| 2012/0242768 | A1 | 9/2012 | Seno et al. | |
| 2012/0293589 | A1 | 11/2012 | Hiraoka | |
| 2013/0065024 | A1 | 3/2013 | Aruga et al. | |
| 2013/0321539 | A1 | 12/2013 | Hiraoka | |
| 2014/0125744 | A1 | 5/2014 | Hiraoka | |
| 2014/0139596 | A1 | 5/2014 | Hiraoka | |
| 2014/0139597 | A1 | 5/2014 | Hiraoka | |
| 2014/0240414 | A1 | 8/2014 | Hiraoka | |
| 2014/0327719 | A1 | 11/2014 | Hiraoka | |
| 2014/0336298 | A1 | 11/2014 | Hiraoka | |
| 2014/0338562 | A1 | 11/2014 | Hiraoka | |
| 2015/0009265 | A1 | 1/2015 | Kohzuki et al. | |
| 2015/0042731 | A1 | 2/2015 | Hiraoka | |
| 2015/0077481 | A1 | 3/2015 | Yoshino et al. | |
| 2015/0091986 | A1 | 4/2015 | Seno et al. | |
| 2015/0099819 | A1 | 4/2015 | Hiraoka | |
| 2015/0126636 | A1 | 5/2015 | Hiraoka | |
| 2015/0130878 | A1 | 5/2015 | Kohzuki et al. | |
| 2015/0232675 | A1 | 8/2015 | Yoshino et al. | |
| 2015/0232676 | A1 | 8/2015 | Hiraoka | |
| 2015/0232677 | A1 | 8/2015 | Hiraoka | |
| 2015/0329729 | A1 | 11/2015 | Hiraoka | |

(Continued)

FOREIGN PATENT DOCUMENTS

| | | |
|---|---|---|
| JP | 2002-265848 | 9/2002 |
| JP | 2004-182764 | 7/2004 |

(Continued)

OTHER PUBLICATIONS

Trimethylolpropane Triacrylate. SDS from Arkema (2013)/ retrieved online. Retrieved on {Dec. 22, 2017]. Retrieved from internet <URL://https://www.arkema.com/export/shared/.content/media/downloads/socialresponsability/safety-summuries/Photocure-Resins-SR-351-TMPTA-GPS-2013-04-11-Vo.pdf> (Year: 2013).*

SR506A—Isobornyl Acrylate. SDS from Sartomer. retrieved online. Retrieved on [Dec. 22, 2017]. Retrieved from Internet <URL://https://www.pharosproject.net/uploads/files/sources/1828/cb31eddbbe4011701dea075dbf321b97c640adbc.pdf> (Year: 2014).*

(Continued)

*Primary Examiner* — Sanza L. McClendon

(74) *Attorney, Agent, or Firm* — Oblon, McClelland, Maier & Neustadt, L.L.P.

(57) ABSTRACT

An active energy ray curable composition is provided. The active energy ray curable composition includes a polymerizable monomer, a polymer component, a polymeric dispersant, and a pigment. The active energy ray curable composition is non-aqueous. The active energy ray curable composition has a yield value of 0.1 Pa or less either when having an initial weight or when being dried to have a weight 70% by mass of the initial weight.

13 Claims, 4 Drawing Sheets

(56) References Cited

U.S. PATENT DOCUMENTS

2016/0009931 A1 1/2016 Kohzuki et al.
2016/0075895 A1 3/2016 Kohzuki et al.
2017/0008325 A1* 1/2017 Hiraoka ............... C09D 167/00

FOREIGN PATENT DOCUMENTS

| JP | 2008-101099 | 5/2008 |
| JP | 2009-258619 | 11/2009 |
| JP | 2012-012471 | 1/2012 |
| JP | 2013-047305 | 3/2013 |
| JP | 2013-112691 | 6/2013 |

OTHER PUBLICATIONS

Solsperse 39000 technical data sheet from Lubrizol Performance coatings. retrieved online. retrieved on [Jul. 9, 2018]. retrieve from internet<URL:://https://www.lubrizol.com/-/media/Lubrizol/Coatings-2/TDS/Solsperse-39000.pdf> (Year: 2012).*
U.S. Appl. No. 14/837,423, filed Aug. 27, 2015.
"Kinou Zairyou (Functional Material)", vol. 25, No. 9, 2005, p. 55(with English Abstract).
Sensitizing potential of 14 mono (meth) acrylates in the guinea pig, H.B. Van Der Walle, et al., Contact Dermatitis , 1982(8), p. 223-235.

* cited by examiner

ACTIVE ENERGY RAY CURABLE COMPOSITION, ACTIVE ENERGY RAY CURABLE INK, INKJET INK, STEREOSCOPIC MODELING MATERIAL, ACTIVE ENERGY RAY CURABLE COMPOSITION CONTAINER, TWO-DIMENSIONAL OR THREE DIMENSIONAL IMAGE FORMING APPARATUS, TWO-DIMENSIONAL OR THREE-DIMENSIONAL IMAGE FORMING METHOD, CURED PRODUCT, AND PROCESSED PRODUCT

CROSS-REFERENCE TO RELATED APPLICATIONS

This patent application is based on and claims priority pursuant to 35 U.S.C. § 119(a) to Japanese Patent Application Nos. 2015-144094 and 2016-061655, filed on Jul. 21, 2015 and Mar. 25, 2016, respectively, in the Japan Patent Office, the entire disclosure of each of which is hereby incorporated by reference herein.

BACKGROUND

Technical Field

The present disclosure relates to an active energy ray curable composition, an active energy ray curable ink, an inkjet ink, a stereoscopic modeling material, an active energy ray curable composition container, a two-dimensional or three-dimensional image forming apparatus, a two-dimensional or three-dimensional image forming method, a cured product, and a processed product.

Description of the Related Art

In the field of inkjet ink, pigment-based inks are generally advantageous over dye-based inks in terms of durability. However, pigments are not always uniformly dissolvable in inks while dyes are generally uniformly dissolvable in inks. Thus, pigments are generally required to be dispersed in inks as uniform as possible.

Low-viscosity pigment-based inks do not show a large yield value even when the dispersion state of the pigment in the ink is not so good. On the other hand, high-viscosity pigment-based inks exhibit a significant degree of structural viscosity and thereby show a large yield value, when the dispersion state of the pigment in the ink is so poor that the pigment is more likely to aggregate.

In this case, it is difficult to discharge the ink from inkjet discharge heads when the ink is in a static state (in which no fluidity is expressed) at an initial stage (in which no shearing stress is applied).

One approach for reliably discharging such an ink in a static state involves applying an adequate amount of shearing stress to the ink for fluidizing the ink, to make the yield value of the ink become smaller than the shearing stress applicable from the inkjet discharge head.

SUMMARY

In accordance with some embodiments of the present invention, an active energy ray curable composition is provided. The active energy ray curable composition includes a polymerizable monomer, a polymer component, a polymeric dispersant, and a pigment. The active energy ray curable composition is non-aqueous. The active energy ray curable composition has a yield value of 0.1 Pa or less either when having an initial weight or when being dried to have a weight 70% by mass of the initial weight.

In accordance with some embodiments of the present invention, an active energy ray curable ink is provided. The active energy ray curable ink includes the above active energy ray curable composition.

In accordance with some embodiments of the present invention, an inkjet ink is provided. The inkjet ink includes the above active energy ray curable ink.

In accordance with some embodiments of the present invention, a stereoscopic modeling material is provided. The stereoscopic modeling material includes the above active energy ray curable composition.

In accordance with some embodiments of the present invention, an active energy ray curable composition container is provided. The active energy ray curable composition container includes a container and the above active energy ray curable composition contained in the container.

In accordance with some embodiments of the present invention, a two-dimensional or three-dimensional image forming apparatus is provided. The two-dimensional or three-dimensional image forming apparatus includes an emitter to emit an active energy ray to the above active energy ray curable composition and a container to contain the active energy ray curable composition.

In accordance with some embodiments of the present invention, a two-dimensional or three-dimensional image forming method is provided. The two-dimensional or three-dimensional image forming method includes the step of emitting an active energy ray to the above active energy ray curable composition to cause the active energy ray composition to cure.

In accordance with some embodiments of the present invention, a cured product is provided. The cured product is produced by a method comprising the step of emitting an active energy ray to the above active energy ray curable composition to cause the active energy ray composition to cure.

In accordance with some embodiments of the present invention, a processed product is provided. The processed product is produced by a method comprising the step of stretching-processing or punching-processing the above cured product.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1A:
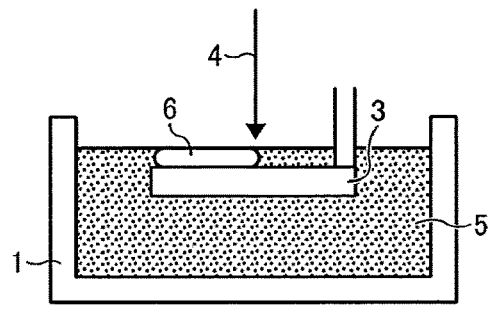
FIGS. 1A to 1D are schematic views of an image forming apparatus according to an embodiment of the present invention.
Figure 1B:
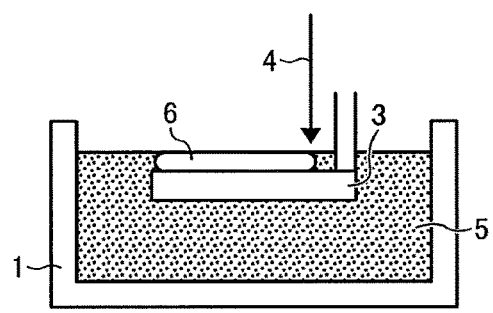
Figure 1C:
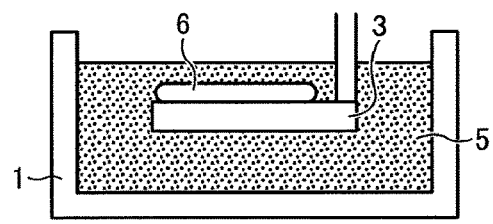
Figure 1D:
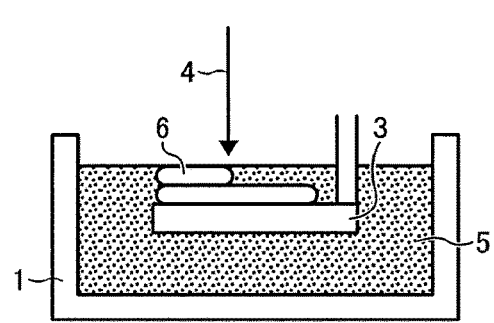

The accompanying drawings are intended to depict example embodiments of the present invention and should not be interpreted to limit the scope thereof. The accompanying drawings are not to be considered as drawn to scale unless explicitly noted.

DETAILED DESCRIPTION

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

For the sake of simplicity, the same reference number will be given to identical constituent elements such as parts and materials having the same functions and redundant descriptions thereof omitted unless otherwise stated.

In accordance with some embodiments of the present invention, an active energy ray curable composition is provided which exhibits reliable inkjet discharge property even when thickened by volatilization at a nozzle surface of an inkjet head.

Active Energy Ray Curable Composition

The active energy ray curable composition according to an embodiment of the present invention includes at least a polymerizable monomer, a polymer component, a polymeric dispersant, and a pigment. The content of the polymeric dispersant is equal to or greater than the saturated adsorption amount thereof to the pigment. Preferably, the polymeric dispersant includes substantially no volatile organic solvent. As the content of the polymeric dispersant is equal to or greater than the saturated adsorption amount thereof to the pigment, the adsorbed polymeric dispersant is less likely to release from the pigment, thereby improving dispersibility of the pigment, i.e., increasing the repulsive force between the pigment particles. Thus, the interactive force between the pigment particles that will make them aggregate is weakened and the pigment particles become fluidizable with a micro shearing force.

Here, "including substantially no volatile solvent" refers to a situation where no volatile organic solvent is included as a constituent of the active energy ray curable composition. That does not refer to a situation where no volatile organic solvent which is derived from other materials such as the polymeric dispersant, the polymerizable monomer, etc. is included.

The use application of the active energy ray curable composition is not limited, but is preferably used as active energy ray curable inks, in particular, inkjet inks. Hereinafter, an active energy ray curable ink (may be simply referred to "ink") according to an embodiment of the present invention is described.

The ink according to an embodiment of the present invention is composed of materials which cause no problem of skin sensitization. Even when the cured product of the ink contains uncured monomers in a small amount, and is touched with one's fingers, no problem of skin sensitization will be caused, providing high safety.

Polymerizable Monomer

Examples of the polymerizable monomer include both monofunctional monomers and polyfunctional monomers.

When containing a monofunctional acrylate or methacrylate as the polymerizable monomer, the ink is able to maintain a low viscosity even with the presence of the polymer component. Preferably, at least one of skin-sensitization-negative photopolymerizable monomers selected from t-butyl methacrylate, n-pentyl methacrylate, and n-hexyl methacrylate is used as the polymerizable monomer.

Each of these monofunctional monomers has vapor pressures of 700 Pa (at 18.5° C.), 69.1 Pa (at 25° C.), and 34.7 Pa (at 20° C.), which are higher than the vapor pressure of 9.7 Pa (at 25° C.) of benzyl acrylate that is one of typical low-viscosity photopolymerizable monomers positive for skin sensitization. Thus, these monofunctional monomers are disadvantageous in terms of drying property. If the ink includes such a low-viscosity photopolymerizable monomer, the ink would be possibly thickened by volatilization near nozzles. Even in such a case, if the ink has a yield value of 0.1 Pa or less even after being dried until the weight thereof is decreased to 70% by mass of the initial weight, the ink would be normally discharged from the nozzles.

Examples of the polymerizable monomer further include polyfunctional acrylates and methacrylates. In particular, the ink preferably includes at least one of skin-sensitization-negative monomers selected from glycerol dimethacrylate, ethylene-oxide-modified trimethylolpropane trimethacrylate, caprolactone-modified dipentaerythritol hexaacrylate, and tricyclodecane dimethanol dimethacrylate. In addition, the ink preferably further includes a polymer or copolymer of at least one of styrene, a styrene derivative, acrylic acid and an acrylate; or a polymer having a polyester structure or a chlorinated olefin structure. Such an ink exhibits good curability and adhesion property to various substrates without surface treatment.

It is to be noted that t-butyl methacrylate, n-pentyl methacrylate, and n-hexyl methacrylate each have a viscosity of from 1 to 2 mPa·s at 25°, which is low. These monomers contribute to lowering the ink viscosity to the range within which the ink can be discharged by inkjet without causing a problem of skin sensitization. However, none of these monomers alone is able to contribute to giving sufficient curability to the ink.

On the other hand, the ink is given practical curability by including at least one of glycerol dimethacrylate, ethylene-oxide-modified trimethylolpropane trimethacrylate, caprolactone-modified dipentaerythritol hexaacrylate, and tricyclodecane dimethanol dimethacrylate. Details of skin sensitization and the SI value that indicates the degree of skin sensitization are described later.

The skin-sensitization-negative photopolymerizable monomer is defined as a compound which satisfies at least one of the following conditions (1) to (3).

(1) A compound having a stimulus index ("SI value") of less than 3, where the SI value indicating the degree of skin sensitization is measured by a skin sensitization test called Local Lymph Node Assay method ("LLNA method").

(2) A compound evaluated according to Material Safety Data Sheet (MSDS) to be negative for skin sensitization or to show no skin sensitization.

(3) A compound evaluated according to a document, such as Contact Dermatitis, 8, 223-235, 1982, to be negative for skin sensitization or to show no skin sensitization.

Regarding (1), it is described in "KINOU ZAIRYOU", Vol. 25, No. 9, 2005, p. 55 that a compound having an SI value of less than 3 is determined to be negative for skin sensitization. As the SI value becomes lower, the skin sensitization becomes lower. Therefore, it is preferable that a monomer having an SI value as low as possible is preferably used. In particular, a monomer having an SI value of less than 3, more preferably 2 or less, and most preferably 1.6 or less, is preferably used.

In addition, the below-listed monomers including acrylates, methacrylates, acrylamides, methacrylamides, and vinyl ethers can be used in combination with the above-described monomers: ethylene glycol diacrylate, ethylene glycol dimethacrylate, hydroxypivalic acid neopentyl glycol diacrylate, hydroxypivalic acid neopentyl glycol dimethacrylate, γ-butyrolactone acrylate, isobornyl acrylate, isobornyl methacrylate, formalized trimethylolpropane monoacrylate, formalized trimethylolpropane monomethacrylate, polytetramethylene glycol diacrylate, polytetramethylene glycol dimethacrylate, trimethylolpropane acrylic acid benzoic acid ester, trimethylolpropane methacrylic acid benzoic acid ester, diethylene glycol diacrylate, triethylene glycol diacrylate, tetraethylene glycol diacrylate, polyethylene glycol diacrylate ($CH_2$=CH—CO—($OC_2H_4$)n-OCOCH=$CH_2$ (n≅9, n≅14, or n≅23)), dipropylene glycol diacrylate, dipropylene glycol dimethacrylate, tripropylene glycol diacrylate, tripropylene glycol dimethacrylate, polypropylene glycol dimethacrylate ($CH_2$=C($CH_3$)—CO—($OC_3H_5$)n-OCOC($CH_3$)=$CH_2$ (n≅7)), 1,3-butanediol diacrylate, 1,4-butanediol diacrylate, 1,4-butanediol dimethacrylate, 1,6-hexanediol diacrylate, 1,6-hexanediol dimethacrylate, 1,9-nonanediol diacrylate, 1,9-nonanediol dimethacrylate, neopentyl glycol diacrylate, neopentyl glycol dimethacrylate, tricyclodecane dimethanol diacrylate, propylene-oxide-modified bisphenol A diacrylate, propylene-oxide-modified bisphenol A dimethacrylate, polyethylene glycol diacrylate, polyethylene glycol dimethacrylate, dipentaerythritol hexaacrylate, dipentaerythritol hexamethacrylate, acryloyl morpholine, methacryloyl morpholine, 2-hydroxypropyl acrylamide, 2-hydroxypropyl methacrylamide, propylene-oxide-modified tetramethylolmethane tetraacrylate, propylene-oxide-modified tetramethylolmethane tetramethacrylate, dipentaerythritol hydroxypentaacrylate, dipentaerythritol hydroxypentamethacrylate, caprolactone-modified dipentaerythritol hydroxypentaacrylate, caprolactone-modified dipentaerythritol hydroxypentamethacrylate, ditrimethylolpropane tetraacrylate, ditrimethylolpropane tetramethacrylate, pentaerythritol tetraacrylate, pentaerythritol tetramethacrylate, trimethylolpropane triacrylate, ethylene-oxide-modified trimethylolpropane triacrylate, propylene-oxide-modified trimethylolpropane triacrylate, propylene-oxide-modified trimethylolpropane trimethacrylate, caprolactone-modified trimethylolpropane triacrylate, caprolactone-modified trimethylolpropane trimethacrylate, pentaerythritol triacrylate, pentaerythritol trimethacrylate, tris(2-hydroxyethyl)isocyanurate triacrylate, tris(2-hydroxyethyl)isocyanurate trimethacrylate, ethoxylated neopentyl glycol diacrylate, ethoxylated neopentyl glycol dimethacrylate, propylene-oxide-modified neopentyl glycol diacrylate, propylene-oxide-modified neopentyl glycol dimethacrylate, propylene-oxide-modified glyceryl triacrylate, propylene-oxide-modified glyceryl trimethacrylate, polyester diacrylate, polyester dimethacrylate, polyester triacrylate, polyester trimethacrylate, polyester tetraacrylate, polyester tetramethacrylate, polyester pentaacrylate, polyester pentamethacrylate, polyester polyacrylate, polyester polymethacrylate, N-vinyl caprolactam, N-vinyl pyrrolidone, N-vinyl formamide, polyurethane diacrylate, polyurethane dimethacrylate, polyurethane triacrylate, polyurethane trimethacrylate, polyurethane tetraacrylate, polyurethane tetramethacrylate, polyurethane pentaacrylate, polyurethane pentamethacrylate, polyurethane polyacrylate, polyurethane polymethacrylate, triethylene glycol divinyl ether, cyclohexanedimethanol divinyl ether, cyclohexanedimethanol monovinyl ether, hydroxyethyl vinyl ether, diethylene glycol monovinyl ether, diethylene glycol divinyl ether, dicyclopentadiene vinyl ether, tricyclodecane vinyl ether, benzyl vinyl ether, ethyloxetane methyl vinyl ether, triethylene glycol divinyl ether, hydroxybutyl vinyl ether, and ethyl vinyl ether.

Polymer Component

The polymer component shows good solubility in the above-described monomer components. Therefore, preferably, the polymer component has a chain-like structure and no cross-linking structure. A chain-like polymer component having too large a molecular weight may be less soluble in the ink. Such a polymer component will be excessively thickened when the ink is dried or evaporated. Thus, the polymer component preferably has an average molecular weight of 100,000 or less.

In addition, preferably, the polymer component is not rigid very much and the crystallinity thereof is not so high, from the viewpoint of solubility. Furthermore, preferably, the polymer component is composed of a material readily available at low cost, from a practical point of view. The polymer component may have certain acid value and/or hydroxyl value for any reason, e.g., adjusting the solubility. When the blending amount of the polymer component is too large, the polymer component will be excessively thickened when the ink is dried or evaporated, thus making it difficult to discharge the ink. Preferably, the amount of the polymer component ranges from 0.1 to 20 parts by weight based on 100 parts by weight of the monomer components.

Specific examples of the polymer component include, but are not limited to, commercially-available products such as HARDLEN® DX530P available from Toyobo Co., Ltd. (a polymer having a chlorinated olefin structure, a weight average molecular weight of 100,000, and a chlorination rate of 30%), HARDLEN® 14-WL-P available from Toyobo Co., Ltd. (a polymer having a chlorinated olefin structure, a weight average molecular weight of 40,000, and a chlorination rate of 27%), and Joncryl® 611 available from BASF (a copolymer of styrene, acrylic/methacrylic acid, and α-methylstyrene, having an acid value of 53 mgKOH/g and a weight average molecular weight of 8,100).

Polymeric Dispersant

Any known polymeric dispersants can be used as the polymer dispersant. In particular, polymeric dispersants having a polar functional group are preferably used.

Owing to the presence of a polar functional group, such a polymeric dispersant easily adsorbs to the pigment, thus improving dispersibility of the pigment in the ink and making the ink easily fluidizable.

Specific examples of the polymeric dispersant include, but are not limited to, hydroxyl-group-containing carboxylic acid esters, salts of long-chain polyaminoamides with high-molecular-weight acid esters, salts of high-molecular-weight polycarboxylic acids, salts of long-chain polyaminoamides with polar acid esters, high-molecular-weight unsaturated acid esters, modified polyurethanes, modified polyacrylates, polyether-ester-type anionic activators, naphthalenesulfonic acid formalin condensate salts, polyoxyethylene alkylphosphoric acid esters, polyoxyethylene nonyl phenyl ethers, polyester polyamines, and stearylamine acetates.

These materials to be used for the polymeric dispersant are commercially available from The Lubrizol Corporation under the trade name of Solsperse™, Kusumoto Chemicals, Ltd. under the trade name of DISPARLON®, and Ajinomoto Fine-Techno CO., Inc. under the trade name of AJISPER.

The content of the polymeric dispersant is equal to or greater than the saturated adsorption amount thereof to the pigment. The saturated adsorption amount is defined as the amount of the polymeric dispersant that adsorbs to the pigment in just proportion. When the saturated adsorption amount of the polymeric dispersant is 1, the content thereof is preferably 5 or less. When the content is less than the saturated adsorption amount, the pigment dispersion stability may be degraded and the yield value may be increased. When the content is in excess of the saturated adsorption amount by 10% by weight, the cured ink may be degraded in strength.

In the case in which the saturated adsorption amount is difficult to determine, the ratio of the adsorption amount of the pigment to the surface area of the pigment can be used in place of the saturated adsorption amount.

Pigment

Any known inorganic and organic pigments can be used as the pigment.

Specific examples usable black pigments include, but are not limited to, carbon blacks which are produced by furnace methods or channel methods.

Specific examples of usable yellow pigments include, but are not limited to, C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 120, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, and C.I. Pigment Yellow 180.

Specific examples of usable magenta pigments include, but are not limited to, C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 57:1, C.I. Pigment Red 112, C.I. Pigment Red 122, C.I. Pigment Red 123, C.I. Pigment Red 168, C.I. Pigment Red 184, C.I. Pigment Red 202, and C.I. Pigment Violet 19.

Specific examples of usable cyan pigments include, but are not limited to, C.I. Pigment Blue 1, C.I. Pigment Blue 2, C.I. Pigment Blue 3, C.I. Pigment Blue 15, C.I. Pigment Blue 15:3, C.I. Pigment Blue 15:4, C.I. Pigment Blue 16, C.I. Pigment Blue 22, C.I. Pigment Blue 60, C.I. Vat Blue 4, and C.I. Vat Blue 60.

Specific examples of usable white pigments, which may be also used as colorless fillers for property reformation, include, but are not limited to, alkaline-earth metal sulfates (e.g., barium sulfate), alkaline-earth metal carbonates (e.g., calcium carbonate), fine powders of silicic acid, silicas (e.g., synthetic silicate), calcium silicates, aluminas, alumina hydrates, titanium oxides, zinc oxides, talc, and clay.

In addition to the above-described pigments, various types of inorganic and organic pigments can be used on demand for adjusting physical properties.

Furthermore, polymerization inhibitors (e.g., 4-methoxy-1-naphthol, methyl hydroquinone, hydroquinone, t-butyl hydroquinone, di-t-butyl hydroquinone, methoquinone, 2,2'-dihydroxy-3,3'-di(α-methylcyclohexyl)-5,5'-dimethyldiphenylmethane, p-benzoquinone, di-t-butyl diphenylamine, 9,10-di-n-butoxyanthracene, and 4,4'-[1,10-dioxo-1,10-decanediylbis(oxy)]bis[2,2,6,6-tetramethyl]-1-piperidinyloxy) and surfactants (e.g., higher fatty acid esters having polyether, amino group, carboxyl group, and/or hydroxyl group; polydimethylsiloxane compounds having polyether, amino group, carboxyl group, and/or hydroxyl group on their side chains or terminals; and fluoroalkyl compounds having polyether, amino group, carboxyl group, and/or hydroxyl group) can also be used, if needed.

The active energy ray curable composition according to an embodiment of the present invention is preferably prepared through the process in which a part of the polymerizable monomer, the polymeric dispersant, and the pigment are previously mixed to prepare a pigment dispersion liquid and the pigment dispersion liquid is then mixed with the rest of the polymerizable monomer and the polymer component.

The blending amount of the pigment is preferably from 2.5 to 5 parts by weight based on 100 parts by weight of the polymerizable monomer.

Polymerization Initiator

The ink according to an embodiment of the present invention preferably includes a photoradical polymerization initiator. More preferably, the ink includes a photoradical polymerization initiator which is negative for skin sensitization.

Acrylates, methacrylates, acrylamides, methacrylamides, and derivatives thereof, and vinyl ether compounds are known be ionic polymerizable. It is to be noted that such ionic polymerization initiators are generally expensive. In addition, ionic polymerization initiators need special care since they slightly generate a strong acid or a strong base even when not being exposed to light. In a case in which such an ionic polymerization initiator is used for the ink, ink supply paths in an inkjet coating system for passing the ink are preferably given acid resistance. In this case, a restriction is caused in selection of structural members of the inkjet coating system. On the other hand, the ink according to an embodiment of the present invention can include a cheap photoradical polymerization initiator which generates neither strong acid nor strong base. This makes it possible to produce the ink at low cost and to select structural members of the inkjet coating system without difficulty. Of course, when a high-energy light source that emits electron beam, α-ray, β-ray, γ-ray, or X-ray is used, a polymerization reaction can proceed without the presence of any polymerization initiator.

Examples of the photoradical polymerization initiator include, but are not limited to, molecular cleavage photopolymerization initiators and hydrogen atom abstraction photopolymerization initiators.

Specific examples of the molecular cleavage photopolymerization initiators include, but are not limited to, 2,2-dimethoxy-1,2-diphenylethane-1-one, 1-hydroxycyclohexyl phenyl ketone, 2-hydroxy-2-methyl-1-phenylpropane-1-one, 1-[4-(2-hydroxyethoxy)-phenyl]-2-hydroxy-2-methyl-1-propane-1-one, 2-hydroxy-1-{4-[4-(2-hydroxy-2-methyl-propionyl)benzyl]phenyl}-2-methyl-1-propane-1-one, phenylglyoxylic acid methyl ester, 2-methyl-1-[4-(methylthio)phenyl]-2-morpholinopropane-1-one, 2-benzyl-2-dimethylamino-1-(4-morpholinophenyl)butanone-1, 2-dimethylamino-2-(4-methylbenzyl)-1-(4-morpholine-4-yl-phenyl)butane-1-one, bis(2,4,6-trimethylbenzoyl)phenylphosphine oxide, bis(2,6-dimethoxybenzoyl)-2,4,4-trimethyl-pentyl-phosphine oxide, 2,4,6-trimethylbenzoylphosphine oxide, 1,2-octanedione[4-(phenylthio)-2-(o-benzoyloxime)], ethanone-1-[9-ethyl-6-(2-methylbenzoyl)-9H-carbazole-3-yl]-1-(0-acetyloxime), and [4-(methylphenylthio)phenyl]phenylmethanone.

Specific examples of hydrogen atom abstraction photopolymerization initiators include, but are not limited to: benzophenone compounds, such as benzophenone, methylbenzophenone, methyl-2-benzoyl benzoate, 4-benzoyl-4'-methyl diphenyl sulfide, and phenylbenzophenone; and thioxanthone compounds such as 2,4-diethylthioxanthone, 2-chlorothioxanthone, isopropylthioxanthone, and 1-chloro-4-propylthioxanthone.

A polymerization accelerator, such as an amine, can be used in combination with the photopolymerization initiator. Specific examples of the polymerization accelerator include, but are not limited to, ethyl p-dimethylaminobenzoate, 2-ethylhexyl p-dimethylaminobenzoate, methyl p-dimethylaminobenzoate, 2-dimethylaminoethyl benzoate, and butoxyethyl p-dimethylaminobenzoate.

Among the above-described polymerization initiators, at least one of 1-hydroxy-cyclohexyl phenyl ketone, 2-dimethylamino-2-(4-methylbenzyl)-1-(4-morpholine-4-yl-phenyl)butane-1-one, and an equimolar mixture of 2,4-diethylthioxanthone with 2-ethylhexyl p-dimethylaminobenzoate, all of which are negative for skin sensitization and readily available, is preferably used.

The ink according to an embodiment of the present invention preferably includes: at least one compound (A) selected from monofunetional acrylates and methacrylates; at least one compound (B) selected from polyfunctional acrylates and methacrylates; at least one compound (C) selected from 1-hydroxy-cyclohexyl phenyl ketone, 2-dimethylamino-2-(4-methylbenzyl)-1-(4-morpholine-4-yl-phenyl)butane-1-one, and an equimolar mixture of 2,4-diethyl-thioxanthone with 2-ethylhexyl p-dimethylaminobenzoate, all of which are cheap and readily-available skin-sensitization-negative polymerization initiators; and the polymer component (D). The blending ratio of the compounds (A) is preferably from 50 to 85 parts by weight when the total amount of the monomer components is 100 parts by weight. The blending ratio of the compounds (B) is preferably from 15 to 50 parts by weight. The blending ratio of the compounds (C) is preferably from 5 to 15 parts by weight. The blending ratio of the polymer component (D) is preferably from 0.1 to 20 parts by weight. The above blending ratios are shown only for illustrations and are not intended to be limiting.

Organic Solvent

The active energy ray curable composition according to an embodiment of the present invention may include an organic solvent. However, it is more preferable that the active energy ray curable composition includes no organic solvent. When the active energy ray curable composition includes no organic solvent, in particular, when the composition is VOC (volatile organic compound) free, a higher degree of safety is provided at sites where the composition is being handled while environment pollution is prevented. Here, the organic solvent refers to a typical non-reactive organic solvent, such as ether, ketone, xylene, ethyl acetate, cyclohexanone, and toluene. The organic solvent is discriminated from a reactive monomer. When the composition is stated to include no organic solvent, it means that the composition "substantially" include no organic solvent. In this case, the content rate of the organic solvent in the composition is preferably less than 0.1% by mass.

Viscosity

The viscosity of the active energy ray curable composition is adjusted in accordance with the purpose of use or application. When the active energy ray curable composition is applied to a discharge device that discharges the composition from nozzles, the viscosity of the composition is preferably from 3 to 40 mPa·s, more preferably from 5 to 15 mPa·s, and most preferably from 6 to 12 mPa·s, at a temperature of from 20° C. to 65° C. Preferably, the active energy ray curable composition exhibits a viscosity within the above-described range even when no organic solvent is included. Viscosity is measured with a cone-plate rotary viscometer (VISCOMETER TVE-22L available from Toki Sangyo Co., Ltd.) using a cone rotor (1° 34'×R24) while setting the revolution to 50 rpm and the temperature of the constant-temperature circulating water to from 20° C. to 65° C. The temperature of the circulating water is adjusted by an instrument VISCOMATE VM-150III.

Yield Value

The active energy ray curable composition according to an embodiment of the present invention has a yield value of 0.1 Pa or less either when having an initial weight or when being dried to have a weight 70% by mass of the initial weight. Even when the active energy ray curable composition is dried until the weight thereof becomes 70% by mass of the initial weight and thickened by volatilization, the composition can be normally discharged from the nozzles when the yield value is 0.1 Pa or less.

Use Application

The active energy ray curable composition can be applied to, for example, modeling resins, paints, adhesives, insulating materials, release agents, coating materials, sealing materials, resists, and optical materials.

For example, the active energy ray curable composition can be applied to active energy ray curable inks for forming two-dimensional texts and images. As another example, the active energy ray curable composition can be applied to stereoscopic modeling materials for forming three-dimensional images (i.e., stereoscopic modeled objects). In particular, the active energy ray curable composition is preferably used for active energy ray curable inks, in particular, inkjet inks.

Substrates on which the active energy ray curable composition is to be coated may be made of materials such as paper, plastic, metal, ceramic, glass, and a composite material thereof. Absorptive substrates, such as high-quality paper sheets, are practically used in combination with both aqueous inks and oil-based inks, which are not quick-drying, with the expectation of permeation and drying effects thereof. On the other hand, non-permeable substrates made of materials such as matt coated paper, gloss coated paper, plastic film, plastic molded product, ceramic, glass, and metal are practically used in combination with quick-drying inks. In this case, the photopolymerizable ink according to an embodiment of the present invention is preferably used since it rapidly cures upon light irradiation.

The active energy ray curable composition according to an embodiment of the present invention is preferably used in combination with such non-permeable substrates. In particular, polypropylene substrates are preferable. In some cases, polypropylene substrates are subjected to a corona treatment for the purpose of activating their surfaces and improving adhesion property. However, in general, it is difficult to perform such a treatment, accompanied by electric spark generation, at sites where coating of the photopolymerizable ink is performed, since the ink is a dangerous material that may cause fire. The active energy curable composition according to an embodiment of the present invention provides sufficient adhesion property to a polypropylene substrate without such a treatment.

The stereoscopic modeling material can be applied to additive manufacturing, material jetting, and optical modeling, each of which is one of stereoscopic modeling processes. In additive manufacturing, the stereoscopic modeling material is used as a binder of powder particles. In material jetting, the stereoscopic modeling material is discharged to a certain region and exposed to an active energy ray to cure, and the cured layers are sequentially laminated to form a stereoscopic object, as described in detail later referring to FIG. 5. In optical modeling, referring to FIGS. 1A to 1D, the stereoscopic modeling material 5 is retained in a pool 1 and exposed to an active energy ray 4 to be formed into a cured layer 6 on a movable stage 3, and the cured layers 6 are sequentially laminated to form a stereoscopic object.

Stereoscopic modeling apparatuses for forming stereoscopic modeled objects with the active energy ray curable composition are not limited in structure and may include a storage for storing the active energy ray curable composition, a supplier, a discharger, and an active energy ray emitter.

Active Energy Ray Curable Composition Container

The active energy ray curable composition container according to an embodiment of the present invention includes a container and the above-described active energy ray curable composition contained in the container.

When the active energy ray curable composition is used for an ink, the active energy ray curable composition container serves as an ink cartridge or an ink bottle, which prevents user from directly contacting the ink when the user is replacing the ink, thus preventing user's fingers and clothes from being contaminated with the ink. In addition, the ink cartridge or ink bottle prevents foreign substances from being mixed into the ink. The container is not limited in shape, size, and material. Preferably, the container is made of a light-blocking material.

Ink Cartridge

An ink cartridge according to an embodiment of the present invention includes a container and the ink according to an embodiment of the present invention contained in the container. The container is not limited in shape, structure, size, and material. Examples of the container include, but are not limited to, an ink bag which may be formed of an aluminum laminate film or a resin film.

The ink cartridge is described in detail below with reference to FIGS. 2 and 3.

Figure 2:
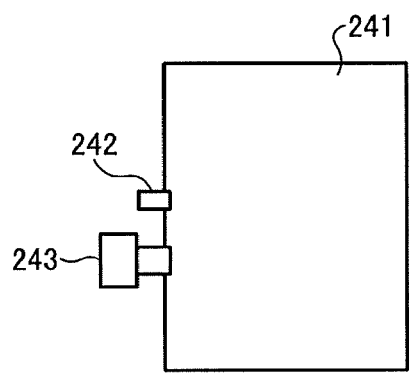
FIG. 2 is a schematic view of an ink bag according to an embodiment of the present invention.
Figure 3:
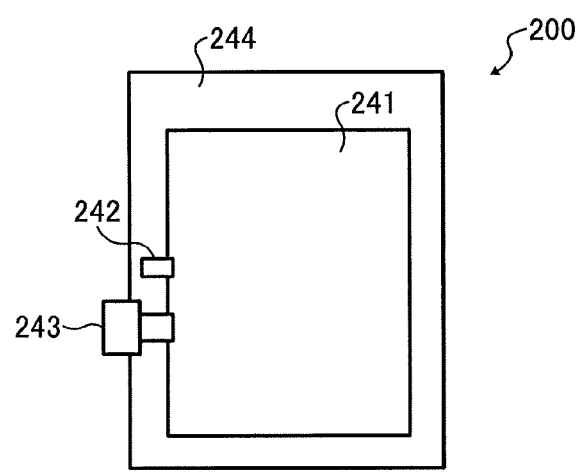
FIG. 3 is a schematic view of an ink cartridge including the ink bag illustrated in FIG. 2.

FIG. 2 is a schematic view of an ink bag 241. FIG. 3 is a schematic view of an ink cartridge 200 including a cartridge casing 244 storing the ink bag 241.

Referring to FIG. 2, an ink is filled in the ink bag 241 through an ink inlet 242. After the air remaining in the ink bag 241 is discharged, the ink inlet 242 is sealed by fusion. When the ink bag 241 is in use, an ink outlet 243, made of a rubber material, is pricked with a needle of the apparatus body, so that the ink is supplied to the apparatus body. The ink bag 241 may be formed of a wrapping material, such as an aluminum laminate film. Referring to FIG. 3, the ink bag 241 is stored in the cartridge casing 244 made of a plastic material, thus providing the ink cartridge 200. The ink cartridge 200 can be detachably attachable to cured product forming devices such as inkjet recording apparatuses.

The ink cartridge containing the ink is preferably detachably attached to cured product forming devices such as inkjet recording apparatuses. In this case, ink supply and ink replacement procedures can be simplified, thus improving workability.

Two-Dimensional or Three-Dimensional Image Forming Method and Apparatus

A two-dimensional or three-dimensional image forming method according to an embodiment of the present invention includes at least the step of emitting an active energy ray to the active energy ray curable composition to cause the active energy ray curable composition to cure. A two-dimensional or three-dimensional image forming apparatus according to an embodiment of the present invention includes at least an emitter to emit an active energy ray to the active energy ray curable composition and a container to contain the active energy ray curable composition. The container included in the two-dimensional or three-dimensional image forming apparatus may be the above-described active energy ray curable composition container. The two-dimensional or three-dimensional image forming method may further include the step of discharging the active energy ray curable composition. The two-dimensional or three-dimensional image forming apparatus may further include a discharger to discharge the active energy ray curable composition. The discharging method may be of a continuous injection type or an on-demand type, but is not limited thereto. Specific examples of the on-demand-type discharging method include thermal methods and electrostatic methods.

Figure 4:
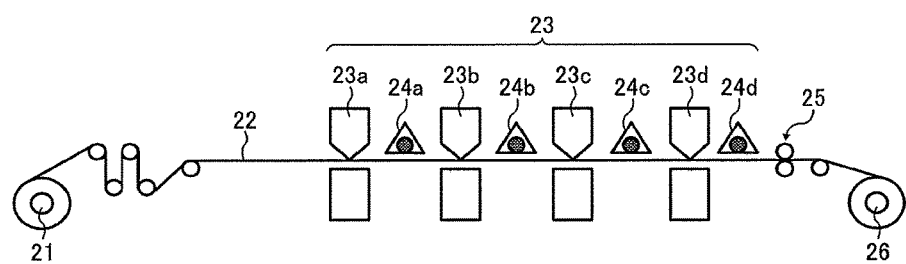
FIG. 4 is a schematic view of an image forming apparatus according to an embodiment of the present invention.

FIG. 4 is a schematic view of an image forming apparatus according to an embodiment of the present invention, which includes an inkjet discharger. The image forming apparatus illustrated in FIG. 4 includes printing units 23a, 23b, 23c, and 23d and a supply roller 21. Each of the printing units 23a, 23b, 23c, and 23d includes an ink cartridge containing an active energy ray curable ink having yellow, magenta, cyan, and black colors, respectively, and a discharge head. The inks are discharged to a recording medium 22 supplied by the supply roller 21. Light sources 24a, 24b, 24c, and 24d emit active energy rays to the respective inks on the recording medium 22 to cause the inks to cure and form color images. The recording medium 22 is then conveyed to a winding roller 26 via a processing unit 25. Each of the printing units 23a, 23b, 23c, and 23d is equipped with a heater for heating the ink at the inkjet discharger. Furthermore, the printing units 23a, 23b, 23c, and 23d may be equipped with a cooler for cooling the recording medium to room temperature with or without contacting the recording medium. The image forming apparatus illustrated in FIG. 4 may be an inkjet recording apparatus employing a serial method or a line method. In the serial method, ink is discharged from a moving discharge head onto a recording medium that is intermittently moved in accordance with the width of the discharge head. In the line method, ink is discharged from a fixed discharge head onto a recording medium that is continuously moved.

Specific preferred materials for the recording medium 22 include, but are not limited to, paper, film, metal, and composite materials thereof, which may be in the form of a sheet. The image forming apparatus illustrated in FIG. 4 may be capable of either one-side printing or duplex printing.

It is possible that the light sources 24a, 24b, and 24c emit weakened active energy rays or no active energy ray and the light source 24d emits an active energy ray after multiple color images have been printed. In this case, energy consumption and cost are reduced.

Recorded matters recorded by the ink according to an embodiment of the present invention include those printed on smooth surfaces such as normal paper and resin films, those printed on irregular surfaces, and those printed on surfaces of various materials such as metal and ceramics. By laminating two-dimensional images, a partially-stereoscopic image (including two-dimensional parts and three-dimensional parts) or a stereoscopic product can be obtained.

Figure 5:
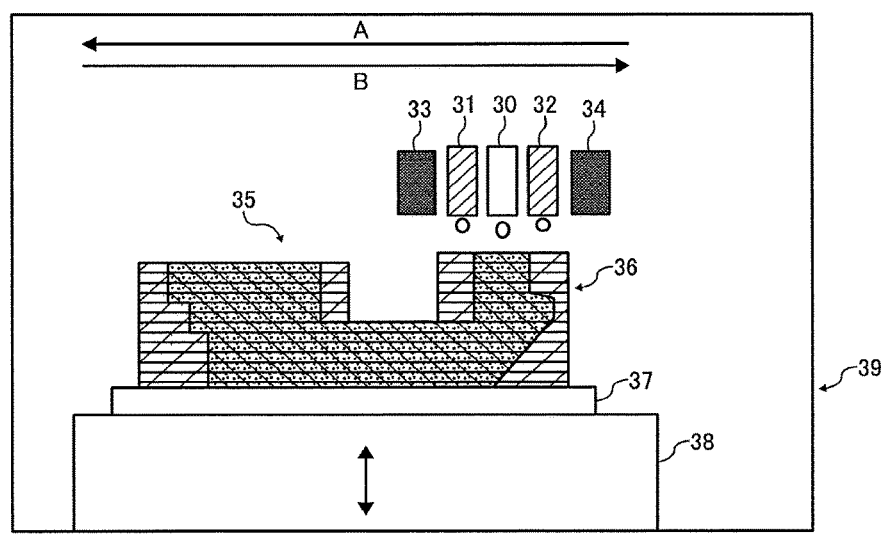
FIG. 5 is a schematic view of an image forming apparatus according to an embodiment of the present invention.

FIG. 5 is a schematic view of a three-dimensional image forming apparatus according to another embodiment of the present invention. Referring to FIG. 5, an image forming apparatus 39 includes a discharge head unit 30 for forming modeled object layers, discharge head units 31 and 32 for forming support layers, and ultraviolet emitters 33 and 34 adjacent to the discharge head units 30, 31, and 32. Each of the discharge head units 30, 31, and 32 includes an inkjet head and is movable in the directions indicated by arrows A and B in FIG. 5. The discharge head unit 30 discharges a first active energy ray curable composition, and the discharge head units 31 and 32 each discharge a second active energy ray curable composition different from the first active energy ray curable composition. The ultraviolet emitters 33 and 34 cause the active energy ray curable compositions to cure. The cured products are laminated in the image forming apparatus 39. More specifically, first, the second active energy ray curable composition is discharged from the discharge head units 31 and 32 onto a modeled object supporting substrate 37 and exposed to an active energy ray to cure, thus forming a first support layer having a reservoir. Next, the first active energy ray curable composition is discharged from the discharge head unit 30 onto the reservoir and exposed to an active energy ray to cure, thus forming a first modeled object layer. These processes are repeated multiple times, in accordance with the set number of lamination, while lowering a stage 38 that is movable in the vertical direction, to laminate the support layers and the modeled object layers. Thus, a stereoscopic modeled object 35 is obtained. A support layer lamination 36 is removed thereafter, if necessary. In the embodiment illustrated in FIG. 5, the number of discharge head unit 30 for forming modeled object layers is one. Alternatively, the number thereof may be two or more.

Cured Product and Processed Product

The cured product according to an embodiment of the present invention is obtainable by causing the active energy ray curable composition to cure. The processed product according to an embodiment of the present invention is obtainable by processing the cured product formed on a substrate, such as a recording medium.

More specifically, the cured product according to an embodiment of the present invention is obtainable by causing the active energy ray curable composition to cure by the action of an active energy ray. For example, the cured product can be obtained by forming a coated film (image) of the active energy ray curable composition on a substrate by an inkjet discharge device and emitting ultraviolet ray to the coated film formed on the substrate to cause the coated film to rapidly cure.

Specific examples of the substrate for use in forming the cured product include, but are not limited to, paper, plastic, metals, ceramics, glass, and composite materials thereof.

Among these materials, plastic substrates are preferable in terms of processability. In particular, plastic films and plastic moldings are preferable, which may be made of polyethylene, polypropylene, polyethylene terephthalate, polycarbonate, ABS (acrylonitrile butadiene styrene) resin, polyvinyl chloride, polystyrene, polyester, polyamide, vinyl materials, acrylic resin, and composite materials thereof.

The processed product according to an embodiment of the present invention is obtainable by processing (e.g., stretching-processing or punching-processing) a surface-decorated article of the cured product formed on the substrate.

The processed product is preferably used for meters and operation panels of automobiles, office automation equipments, electric or electronic devices, and cameras, which typically need to be surface-decorated.

EXAMPLES

Having generally described this invention, further understanding can be obtained by reference to certain specific examples which are provided herein for the purpose of illustration only and are not intended to be limiting.

Preparation of Carbon Black Dispersion Liquid 1

A photopolymerizable monomer (n-pentyl methacrylate, available from Zhangjiagang Render Chemical Co., Ltd. under the trade name of n-Amyl Methacrylate) was mixed with a carbon black (#5 available from Mitsubishi Chemical Corporation) in the presence of an amino-group-containing polyester-based polymeric dispersant (Solsperse™ 32000 available from The Lubrizol Corporation). Thus, a carbon black dispersion liquid 1 containing 15% by weight of the carbon black and 0.9% by weight of the polymeric dispersant was prepared.

Preparation of Carbon Black Dispersion Liquid 2

A photopolymerizable monomer (n-pentyl methacrylate, available from Zhangjiagang Render Chemical Co., Ltd. under the trade name of n-Amyl Methacrylate) was mixed with a carbon black (#5 available from Mitsubishi Chemical Corporation) in the presence of an amino-group-containing polyester-based polymeric dispersant (Solsperse™ 32000 available from The Lubrizol Corporation). Thus, a carbon black dispersion liquid 2 containing 15% by weight of the carbon black and 5% by weight of the polymeric dispersant was prepared.

Preparation of Carbon Black Dispersion Liquid 3

A photopolymerizable monomer (t-butyl methacrylate, available from Mitsubishi Rayon Co., Ltd. under the trade name of ACRYESTER TB) was mixed with a carbon black (#5 available from Mitsubishi Chemical Corporation) in the presence of an amino-group-containing polyester-based polymeric dispersant (Solsperse™ 32000 available from The Lubrizol Corporation). Thus, a carbon black dispersion liquid 3 containing 15% by weight of the carbon black and 5% by weight of the polymeric dispersant was prepared.

Preparation of Carbon Black Dispersion Liquid 4

A photopolymerizable monomer (n-hexyl methacrylate, available from Tokyo Chemical Industry Co., Ltd. under the trade name of n-Hexyl Methacrylate) was mixed with a carbon black (#5 available from Mitsubishi Chemical Corporation) in the presence of an amino-group-containing polyester-based polymeric dispersant (Solsperse™ 32000 available from The Lubrizol Corporation). Thus, a carbon black dispersion liquid 4 containing 15% by weight of the carbon black and 5% by weight of the polymeric dispersant was prepared.

Relation between Amount of Adsorption of Polymeric Dispersant to Carbon Black and Blending Ratio of Polymeric Dispersant The carbon black dispersion liquids 1 to 4 prepared above were subjected to a determination of the relation between the amount of absorption of the polymeric dispersant to the carbon black and the blending ratio of the polymeric dispersant. The result is shown in FIG. 6.

Figure 6:
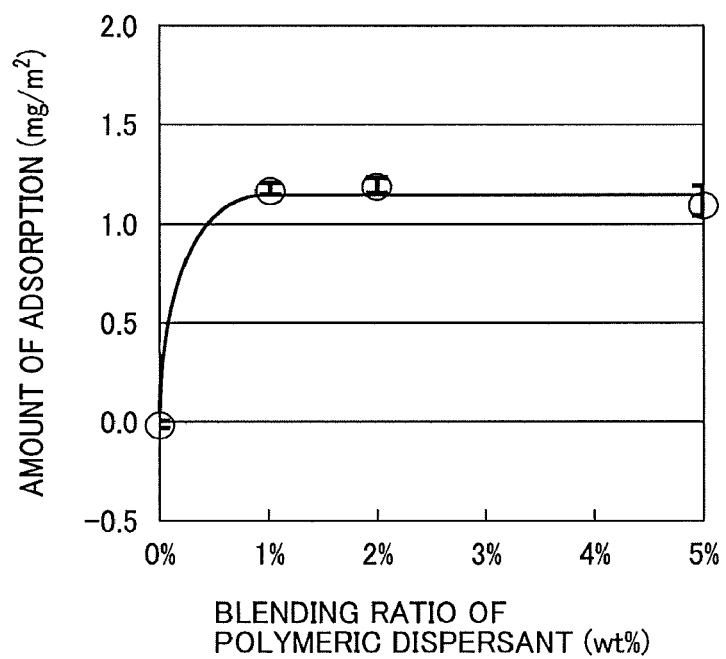
FIG. 6 is a graph showing a relation between the amount of absorption of a polymeric dispersant to a carbon black and the blending ratio of the polymeric dispersant according to an embodiment of the present invention.

In FIG. 6, the blending ratio of the polymeric dispersant represents the content of the polymeric dispersant in each carbon black dispersion liquid.

It is clear that the adsorption amount is zero when the blending ratio of the polymeric dispersant is 0%. When the blending ratio of the polymeric dispersant is from 0.1% to 1%, the amount of adsorption increases as the blending ratio increases. When the blending ratio of the polymeric dispersant is 1% or greater, the amount of adsorption becomes constant. This result indicates that the adsorption is unsaturated when the blending ratio of the polymeric dispersant is less than 1%, but is saturated when the blending ratio of the polymeric dispersant is 1% or greater. When the blending ratio of the polymeric dispersant is 1%, the polymeric dispersant adsorbs to the carbon black in just proportion. When the blending ratio of the polymeric dispersant is in excess of 1%, i.e., 5% or 10%, the polymeric dispersant is excessively blended.

Measurement of Amount of Adsorption of Polymeric Dispersant to Carbon Black

The amount of adsorption was measured in the following manner.

(1) Each dispersion liquid was subjected to centrifugal separation. The resulting solid contents were washed with acetone to isolate the carbon black to which the polymeric dispersant was adsorbed.

(2) The carbon black thus collected was burnt at 450° C. The decrease in weight of the carbon black before and after the burning was measured to determine the amount of adsorption of the polymeric dispersant. It was previously confirmed that the carbon black itself decreased its weight in a very small amount under the above burning condition. Thus, the amount of adsorption was corrected by taking into account the weight decrease of the carbon black itself.

(3) The amount of adsorption of the polymeric dispersant per unit weight of the carbon black was converted into the amount of adsorption of the polymeric dispersant per unit surface area of the carbon black, using the specific surface area value (29 $m^2/g$ listed in its catalog) of the carbon black.

Evaluation of SI Value

SI values were measured based on a skin sensitization test according to the LLNA method as follows.

Test Materials

Positive Control

As a positive control, α-hexyl cinnamaldehyde (HCA, product of Wako Pure Chemical Industries, Ltd.) was used.

Medium

As a medium, a mixture liquid of acetone (product of Wako Pure Chemical Industries, Ltd.) and olive oil (produced of Fudimi Pharmaceutical Co., Ltd.) in a volume ratio of 4/1 was used.

Animals Used

Before treated with the test materials, the positive control, or the medium control, female mice were acclimated for 8 days including 6-day quarantine. No abnormalities were found in all the mice (used animals) during the quarantine/acclimation period. Based on the body weights measured 2 days before the initiation of sensitization, they were categorized into 2 groups (4 mice/group) by the body weight stratified random sampling method so that the body weight of each individual was within ±20% of the average body weight of all the individuals. Each of the used animals was 8 weeks old to 9 weeks old at the time of the initiation of sensitization. The individuals remaining after the categorization were excluded from the test.

The used animals were individually identified by application of oil ink to their tale throughout the test period, and also their cages were labeled for identification.

Housing Environment

Throughout the housing period including the quarantine/acclimation period, the used animals were housed in an animal room with barrier system, which was set as follows: 21° C. to 25° C. in temperature, 40% to 70% in relative humidity, 10 to 15 times/hour in frequency of air circulation, and a 12 hour-interval lighting cycle (lighting from 7:00 to 19:00).

The housing cages used were those made of polycarbonate, and four animals were housed in each cage.

The used animals were given ad libitum solid feed for laboratory animals MF (product of Oriental Yeast Co., Ltd.). Also, using a water-supply bottle, the used animals were given ad libitum tap water in which sodium hypochlorite (PURELOX, product of OYALOX Co., Ltd.) had been added so that the chlorine concentration was about 5 ppm. Bedding used was SUNFLAKE (fir tree, shavings obtained with a power planer) (product of Charles River Inc.). The feed and all of the feeding equipment were sterilized with an autoclave (121° C., 30 min) before use.

The housing cage and the bedding were replaced with new ones at the times of the categorization and the removal of the auricular lymph node (i.e., the time when the animals were transferred from the animal room), and the water-supply bottle and rack were replaced with new ones at the time of the categorization.

Test Method

Group Composition

The group compositions of the medium control group and positive control group used for the measurement of the SI value are shown in Table 1.

TABLE 1

| Test group | Sensitization substance | Sensitization dose (µL/auricle) | Times of sensitization | Number of animals (Animal No.) |
|---|---|---|---|---|
| Medium control group | Medium only | 25 | Once/day × 3 days | 4 (1-4) |
| Positive control group | 25.0% HCA | 25 | Once/day × 3 days | 4 (5-8) |

Preparation

Test Substance

Table 2 shows the amount of the test substance. The test substance was weighed in a measuring flask, and the volume of the test substance was adjusted to 1 mL with the medium. The thus-prepared test substance preparation was placed in a light-shielded airtight container (made of glass).

TABLE 2

| | Concentration after adjustment (w/v %) | Mass of test substance (g) |
|---|---|---|
| Test substance | 50.0 | 0.5 |

Positive Control

About 0.25 g of HCA was accurately weighed, and the medium was added to the HCA to have the volume of 1 mL, to thereby prepare a 25.0% by weight/volume solution. The thus-prepared positive control substance preparation was placed in a light-shielded airtight container (made of glass).

BrdU

In a measuring flask, 200 mg of 5-bromo-2'-deoxyuridine (BrdU, product of NACALAI TESQUE, INC.) was accurately weighed in a measuring flask. Then, physiological saline (product of OTSUKA PHARMACEUTICAL CO., LTD.) was added to the measuring flask, and dissolved through application of ultrasonic waves. Thereafter, the volume of the resultant solution was adjusted to 20 mL to prepare a 10 mg/mL solution (BrdU preparation). The BrdU preparation was sterilized through filtration with a sterilized filtration filter and placed in a sterilized container.

Preparation Day and Storage Period

The positive control preparation was prepared on the day before the initiation of sensitization, and stored in a cold place except in use. The medium and the test substance preparations were prepared on the day of sensitization. The BrdU preparation was prepared 2 days before administration and stored in a cold place until the day of administration.

Sensitization and Administration of BrdU

Sensitization

Each (25 µL) of the test substance preparations, the positive control preparation, or the medium was applied to both the auricles of each of the used animals using a micropipetter. This treatment was performed once a day for three consecutive days.

Administration of BrdU

About 48 hours after the final sensitization, the BrdU preparation (0.5 mL) was intraperitoneally administered once to each of the used animals.

Observation and Examination

General Conditions

All the used animals used for the test were observed once or more times a day from the day of the initiation of sensitization to the day of the removal of the auricular lymph node (i.e., the day when the animals were transferred from the animal room). Notably, the observation day was counted from the day of the initiation of sensitization being regarded as Day 1.

Measurement of Body Weights

The body weight of each of the used animals was measured on the day of the initiation of sensitization and on the day of the removal of the auricular lymph node (i.e., the day when the animals were transferred from the animal room). Also, the average of the body weights and the standard error thereof were calculated for each group.

Removal of Auricular Lymph Node and Measurement of Weight Thereof

About 24 hours after the administration of BrdU, the used animals were allowed to undergo euthanasia, and their auricular lymph nodes were sampled. The surrounding tissue of each auricular lymph node was removed, and the auricular lymph nodes from both the auricles were collectively weighed. Also, the average of the weights of the auricular lymph nodes and the standard error thereof were calculated for each group. After the measurement of the weights, the auricular lymph nodes of each individual were stored in a frozen state using a BIO MEDICAL FREEZER set to −20° C.

Measurement of BrdU Intake

After returning the auricular lymph nodes to room temperature, the auricular lymph nodes were mashed with the gradual addition of physiological saline, and suspended therein. The thus-obtained suspension was filtrated and then dispensed into the wells of a 96-well microplate, with 3 wells being used per individual. The thus-dispensed suspensions were measured for intake of BrdU by the ELISA method. The reagents used were those of a commercially available kit (Cell Proliferation ELISA, BrdU colorimetric, Cat. No. 1647229, product of Roche Diagnostics Inc.). A multiplate reader (FLUOSTAR OPTIMA, product of BMG LABTECH Inc.) was used to measure the absorbance of each well (OD: 370 nm to 492 nm, the intake of BrdU), and the average of the absorbance of the 3 wells for each individual was used as the measurement of BrdU for the individual.

Evaluation of Results

Calculation of Stimulation Index (SI)

As shown in the following formula, the measurement of BrdU intake for each individual was divided by the average of the measurements of BrdU intake in the medium control group to calculate the SI value for the individual. The SI value of each test group was the average of the SI values of the individuals. Also, the standard error of the SI values was calculated for each test group. Notably, the SI value was rounded at the second decimal place and shown to the first decimal place.

$$SI = \frac{\text{Average of measurements of } BrdU \text{ intake for each individual (average of 3 wells)}}{\text{Average of measurements of } BrdU \text{ intake in the medium control group (average of 4 animals)}}$$

Examples 1-4, Comparative Examples 1-4, and Reference Examples 1-2

The below-listed materials (A) to (D) were mixed with each of the carbon black dispersion liquids 1 to 4 according to the blending ratios described in Table 3 (in which numerical values represent parts by weight), thus preparing black inks of Examples 1-4, Comparative Examples 1-4, and Reference Examples 1-2.

(A) Monofunctional Acrylate or Methacrylate
(B) Polyfunctional Acrylate or Methacrylate
(C) Skin-sensitization-negative Photoradical Polymerizable Initiator
(D) Polymer Component (difficult to permeate skin for its high molecular weight, thus showing no skin sensitization)

Details of the materials A1-A3, B1-B4, C1-C2, and D1-D6 described in Table 3 are listed below. It is to be noted that a numerical value in brackets added to the end of each material represents an SI value measured by the LLNA test. In the case in which the word "Negative" or "None" appears in the brackets, it means that the material is evaluated as being negative for skin sensitization or showing no skin sensitization by a test method according to the above-described document (i.e., Contact Dermatitis, 8, 223-235, 1982) or Material Safety Data Sheet (MSDS). In the case in which the word "Positive" appears in the brackets, it means that the material is a dangerous substance which should be added with the risk phrase code No. R43 (May cause sensitisation by skin contact) defined by the European Union.

A1: n-Pentyl methacrylate, available from Zhangjiagang Render Chemical Co., Ltd. under the trade name of "n-Amyl Methacrylate". (Negative, when evaluated by Maximization test method according to the document.)

A2: t-Butyl methacrylate, available from Mitsubishi Rayon Co., Ltd. under the trade name of "ACRYESTER TB". (Negative, when evaluated by Maximization test method according to the document.)

A3: n-Hexyl methacrylate, available from Tokyo Chemical Industry Co., Ltd. under the trade name of "n-Hexyl Methacrylate". (Negative, when evaluated by Maximization test method according to the document.)

B1: Glycerol dimethacrylate, available from Shin-Nakamura Chemical Co., Ltd. under the trade name of "701". (1.2)

B2: Tricyclodecane dimethanol dimethacrylate, available from Shin-Nakamura Chemical Co., Ltd. under the trade name of "DCP". (1.3)

B3: Ethylene-oxide-modified trimethylolpropane trimethacrylate, available from Shin-Nakamura Chemical Co., Ltd. under the trade name of "TMPT-3EO"). (1.0)

B4: Caprolactone-modified dipentaerythritol hexaacrylate, available from Nippon Kayaku Co., Ltd. (Negative, when evaluated by a test method based on OECD Test Guideline 406 according to MSDS.)

C1: 1-Hydroxy-cyclohexyl phenyl ketone, available from BASF under the trade name of "IRGACURE 184". (None, when evaluated by a test method based on OECD Test Guideline 406 according to MSDS.)

C2: 2-Dimethylamino-2-(4-methylbenzyl)-1-(4-morpholine-4-yl-phenyl)butane-1-one, available from BASF under the trade name of "IRGACURE 379". (None, when evaluated by a test method based on OECD Test Guideline 406 according to MSDS.)

D1: Polymer having a chlorinated olefin structure, a weight average molecular weight of 100,000, and a chlorination rate of 30%, available from Toyobo Co., Ltd. under the trade name of "HARDLEN® DX530P".

D2: Polymer having a chlorinated olefin structure, a weight average molecular weight of 40,000, and a chlorination rate of 27%, available from Toyobo Co., Ltd. under the trade name of "HARDLEN® 14-WL-P".

D3: Copolymer of styrene, acrylic/methacrylic acid, and α-methylstyrene, having an acid value of 53 mgKOH/g and a weight average molecular weight of 8,100, available from BASF under the trade name of "Joncryl® 611".

D4: Polymer having a chlorinated olefin structure and a weight average molecular weight of 200,000.

D5: Polymer having a chlorinated olefin structure and a weight average molecular weight of 90,000.

D6: Polymer having a chlorinated olefin structure and a weight average molecular weight of 110,000.

Yield values and inkjet discharge properties of the inks of Examples 1-4, Comparative Examples 1-4, and Reference Examples 1-2 were evaluated as follows. The results are shown in Table 4.

Yield Value

Yield value was calculated from the Casson Plots obtained according to the following formula (1), based on the viscosity values measured while changing the shearing speed.

$$\sqrt{\tau} = \sqrt{\eta\infty} \times \sqrt{D} + \sqrt{\tau 0} \qquad (1)$$

In the formula (1), T represents a shearing stress (Pa), D represents a shearing speed (1/sec), and each of $\sqrt{\eta\infty}$ and $\sqrt{\tau 0}$ is a constant.

The Casson plots on a graph showing $\sqrt{\tau}$ and $\sqrt{D}$ on the vertical and lateral axes, respectively, generally show a good linearity and are widely used for analyzing rheological property of pigment-dispersion systems. In the graph, $\sqrt{\tau 0}$ corresponds to the intercept of the vertical axis. The square of $\sqrt{\tau 0}$, i.e., $\tau 0$, represents a yield value.

It was confirmed that the Casson plots of each ink showed a good linearity and therefore the use of the formula (1) was reasonable.

Inkjet Discharge Property

Each black ink was heated to 50° and left in an inkjet discharge head GEN4 (having a nozzle diameter of 26 μm, a product of Ricoh Printing Systems, Ltd.) without a cap for 10 minutes. Thereafter, the ink was subjected to a discharge property evaluation. Before the discharge property evaluation, a predetermined dummy discharge was performed.

A: The ink could be discharged.
B: The ink could not be discharged.

Density

A solid image was printed with each ink using the above discharge head on a white polycarbonate substrate and then irradiated with light emitted from a metal halide lamp until the accumulate amount of light became 1,000 mJ/cm². The density of the cured image was measured with a densitometer Model 939 from X-Rite.

A: The density was 1.2 or more.
B: The density was less than 1.2.

TABLE 3

| Materials | | Example 1 | Example 2 | Example 3 | Example 4 | Comparative Example 1 | Comparative Example 2 | Comparative Example 3 | Comparative Example 4 | Reference Example 1 | Reference Example 2 |
|---|---|---|---|---|---|---|---|---|---|---|---|
| A | A1 | 70 | | | 70 | 70 | 70 | 70 | 70 | 70 | 70 |
|  | A2 | | 70 | | | | | | | | |
|  | A3 | | | 70 | | | | | | | |
| B | B1 | | | | | | | | | | |
|  | B2 | 30 | 30 | 30 | 30 | 30 | 30 | 30 | 30 | 30 | 30 |
|  | B3 | | | | | | | | | | |
|  | B4 | | | | | | | | | | |
| C | C1 | 10 | 10 | 10 | 10 | 10 | 10 | 10 | 10 | 10 | 10 |
|  | C2 | | | | | | | | | | |
| D | D1 | 10 | | | | 10 | 21 | | | 10 | 10 |
|  | D2 | | 0.1 | | | | | | | | |
|  | D3 | | | 20 | | | | | | | |
|  | D4 | | | | | | | | 10 | | |
|  | D5 | | | | 10 | | | | | | |
|  | D6 | | | | | | | | 10 | | |
| Carbon Black Dispersion Liquid | | Liquid 2 | Liquid 3 | Liquid 4 | Liquid 2 | Liquid 1 | Liquid 2 | Liquid 2 | Liquid 2 | Liquid 2 | Liquid 2 |
|  | | 20 | 25 | 30 | 20 | 20 | 20 | 20 | 20 | 10 | 40 |

TABLE 4

| | Ink Weight (%) | | rpm 100 / Shearing Speed D (1/sec) 382.8 / √D 19.57 | rpm 50 / 191.4 / 13.83 | rpm 20 / 76.56 / 8.75 | rpm 10 / 38.28 / 6.19 | Yield Value (Pa) | Discharge Property | Density |
|---|---|---|---|---|---|---|---|---|---|
| Example 1 | 100 | η (mPas) | 10.5 | 10.51 | 10.49 | 10.44 | 0.004 | A | A |
| | | Shearing Stress √τ | 63.4 | 44.85 | 28.34 | 19.99 | | | |
| | 70 | η (mPas) | 28.9 | 28.9 | 28.99 | 28.9 | 0.002 | | |
| | | Shearing Stress √τ | 105.18 | 74.37 | 47.11 | 33.26 | | | |
| Example 2 | 100 | η (mPas) | 7.79 | 7.81 | 7.84 | 7.86 | 0.016 | A | A |
| | | Shearing Stress √τ | 54.61 | 38.66 | 24.5 | 17.35 | | | |
| | 70 | η (mPas) | 17.76 | 17.75 | 17.74 | 17.7 | 0.003 | | |
| | | Shearing Stress √τ | 82.45 | 58.29 | 36.85 | 26.03 | | | |
| Example 3 | 100 | η (mPas) | 14.12 | 14.15 | 14.17 | 14.13 | 0.002 | A | A |
| | | Shearing Stress √τ | 73.52 | 52.04 | 32.94 | 23.26 | | | |
| | 70 | η (mPas) | 56.44 | 56.56 | 56.76 | 56.9 | 0.091 | | |
| | | Shearing Stress √τ | 146.99 | 104.05 | 65.92 | 46.67 | | | |
| Example 4 | 100 | η (mPas) | 9.8 | 9.82 | 9.84 | 9.85 | 0.007 | A | A |
| | | Shearing Stress √τ | 61.25 | 43.35 | 27.45 | 19.42 | | | |
| | 70 | η (mPas) | 26.85 | 26.9 | 26.93 | 26.94 | 0.01 | | |
| | | Shearing Stress √τ | 101.38 | 71.75 | 45.41 | 32.11 | | | |
| Comparative Example 1 | 100 | η (mPas) | 11.14 | 11.25 | 11.3 | 11.36 | 0.111 | B | A |
| | | Shearing Stress √τ | 65.3 | 46.4 | 29.41 | 20.85 | | | |
| | 70 | η (mPas) | 31.7 | 31.85 | 32 | 32.9 | 0.585 | | |
| | | Shearing Stress √τ | 110.16 | 78.08 | 49.5 | 35.49 | | | |
| Comparative Example 2 | 100 | η (mPas) | 28.9 | 28.9 | 28.96 | 28.9 | 0.001 | *2 | — |
| | | Shearing Stress √τ | 105.18 | 74.37 | 47.09 | 33.26 | | | |
| | 70 | η (mPas) | | | *1 | | | | |
| | | Shearing Stress √τ | | | | | | | |
| Comparative Example 3 | 100 | η (mPas) | 28.1 | 28.28 | 28.39 | 28.41 | 0.11 | *2 | — |
| | | Shearing Stress √τ | 103.71 | 73.57 | 46.62 | 32.98 | | | |
| | 70 | η (mPas) | | | *1 | | | | |
| | | Shearing Stress √τ | | | | | | | |
| Comparative Example 4 | 100 | η (mPas) | 12.5 | 12.6 | 12.7 | 12.8 | 0.168 | B | A |
| | | Shearing Stress √τ | 69.17 | 49.11 | 31.18 | 22.14 | | | |
| | 70 | η (mPas) | 33.1 | 33.23 | 33.45 | 33.66 | 0.208 | | |
| | | Shearing Stress √τ | 112.56 | 79.75 | 50.61 | 35.9 | | | |
| Reference Example 1 | 100 | η (mPas) | 10 | 10.03 | 10.03 | 10.05 | 0.006 | A | B |
| | | Shearing Stress √τ | 61.87 | 43.81 | 27.71 | 19.61 | | | |
| | 70 | η (mPas) | 28 | 28.05 | 28.1 | 28.1 | 0.012 | | |
| | | Shearing Stress √τ | 103.53 | 73.27 | 46.38 | 32.8 | | | |
| Reference Example 2 | 100 | η (mPas) | 12 | 12.08 | 12.13 | 12.2 | 0.077 | A | *3 |
| | | Shearing Stress √τ | 67.78 | 48.08 | 30.47 | 21.61 | | | |
| | 70 | η (mPas) | 31.4 | 31.49 | 31.55 | 31.65 | 0.044 | | |
| | | Shearing Stress √τ | 109.64 | 77.63 | 49.15 | 34.81 | | | |

*1) Yield value was unmeasurable since the ink viscosity went beyond the upper measuring limit of the viscometer in use. The ink was not able to fluidize by its own weight even when the ink container was tilted.
*2) Discharge property could not be determined since there was a difficulty in supplying the ink to the discharge head through the ink path.
*3) Density was unmeasurable since the ink did not cure.

In Comparative Example 1, the carbon black dispersion liquid in which adsorption of the polymeric dispersant to the carbon black had not been saturated was used. Thus, it is assumed that the carbon black was not sufficiently dispersed therein. The ink obtained by diluting this carbon black dispersion liquid had a very large yield value and could not be discharged.

In Comparative Example 2, the blending amount of the polymer component was high. As the ink was dried or evaporated until its weight became 70% of the initial weight, the fluidity of the ink became so poor that the viscosity was unmeasurable. It is assumed that the ink had a significantly large yield value. It was difficult to evaluate discharging property.

In Comparative Example 3, the molecular weight of the polymer component was high. As the ink was dried or evaporated until its weight became 70% of the initial weight, the fluidity of the ink became so poor that the viscosity was unmeasurable. It is assumed that the ink had a significantly large yield value. It was difficult to evaluate discharging property.

In Comparative Example 4, the molecular weight of the polymer component was high, and the yield value exceeded 0.1 Pa.

In Reference Example 1, the pigment density was too low to produce a predetermined density.

In Reference Example 2, the pigment density was so high that curing of the ink was defective.

In Examples 1-4, the carbon black liquid in which adsorption of the polymeric dispersant to the carbon black had been saturated was used. Although this carbon black dispersion liquid was diluted with a diluting liquid in which the polymeric dispersant was previously dissolved, to obtain the ink, the dispersibility of the carbon black was not degraded. As a result, the yield value was kept at 0.1 Pa or less, and the ink could be discharged.

Example 5

Preparation of Cyan Ink

The procedure for preparing the carbon black dispersion liquid 2 was repeated except for replacing the carbon black (#5B available from Mitsubishi Chemical Corporation) with Cyanine Blue 4993M (available from Dainichiseika Color & Chemicals Mfg. Co., Ltd.), thus preparing a cyan dispersion liquid. The procedure for preparing the black ink in Example 1 was repeated except for replacing the carbon black dispersion liquid with the cyan dispersion liquid. Thus, a cyan ink was prepared.

Example 6

Preparation of Magenta Ink

The procedure for preparing the carbon black dispersion liquid 2 was repeated except for replacing the carbon black (#5B available from Mitsubishi Chemical Corporation) with KET Red 301 (available from DIC Corporation), thus preparing a magenta dispersion liquid. The procedure for preparing the black ink in Example 1 was repeated except for replacing the carbon black dispersion liquid with the magenta dispersion liquid. Thus, a magenta ink was prepared.

Example 7

Preparation of Yellow Ink

The procedure for preparing the carbon black dispersion liquid 2 was repeated except for replacing the carbon black (#5B available from Mitsubishi Chemical Corporation) with Lionol Yellow 1405G (available from Toyo Ink Co., Ltd.), thus preparing an yellow dispersion liquid. The procedure for preparing the black ink in Example 1 was repeated except for replacing the carbon black dispersion liquid with the yellow dispersion liquid. Thus, a yellow ink was prepared.

In Examples 5-7, yield value and inkjet discharge property were evaluated in the same manner as in Example 1. The results are shown in Table 5.

TABLE 5

| | | | rpm | | | | | |
|---|---|---|---|---|---|---|---|---|
| | | | 100 | 50 | 20 | 10 | | |
| | | | Shearing Speed D (1/sec) | | | | | |
| | Ink | | 382.8 | 191.4 | 76.56 | 38.28 | Yield | |
| | Weight | | | $\sqrt{D}$ | | | Value | Discharge |
| | (%) | | 19.57 | 13.83 | 8.75 | 6.19 | (Pa) | Property |
| Example 5 | 100 | η (mPas) | 9.98 | 10.00 | 10.01 | 10.02 | 0.004 | A |
| | | Shearing Stress $\sqrt{\tau}$ | 61.81 | 43.75 | 27.68 | 19.58 | | |
| | 70 | η (mPas) | 27.5 | 27.7 | 27.7 | 27.7 | 0.053 | |
| | | Shearing Stress $\sqrt{\tau}$ | 102.60 | 72.81 | 46.05 | 32.56 | | |
| Example 6 | 100 | η (mPas) | 9.15 | 9.16 | 9.18 | 9.19 | 0.005 | A |
| | | Shearing Stress $\sqrt{\tau}$ | 59.18 | 41.87 | 26.51 | 18.76 | | |
| | 70 | η (mPas) | 27 | 27.1 | 27.2 | 27.3 | 0.079 | |
| | | Shearing Stress $\sqrt{\tau}$ | 101.66 | 72.02 | 45.63 | 32.33 | | |
| Example 7 | 100 | η (mPas) | 9.01 | 9.02 | 9.03 | 9.03 | 0.002 | A |
| | | Shearing Stress $\sqrt{\tau}$ | 58.73 | 41.55 | 26.29 | 18.59 | | |
| | 70 | η (mPas) | 26.5 | 26.54 | 26.55 | 26.57 | 0.005 | |
| | | Shearing Stress $\sqrt{\tau}$ | 100.72 | 71.27 | 45.09 | 31.89 | | |

Similar to Example 1, the pigment dispersion liquid in which adsorption of the polymeric dispersant to the pigment had been saturated was used. Although this pigment dispersion liquid was diluted with a diluting liquid in which the polymeric dispersant was previously dissolved, to obtain the ink, the dispersibility of the pigment was not degraded. As a result, the yield value was kept at 0.1 Pa or less, and the ink could be discharged.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An active energy ray curable composition, comprising:
   a polymerizable monomer having a stimulus index (SI) value of less than 2.0 and comprising at least one skin-sensitization-negative photopolymerizable monomer selected from the group consisting of glycerol dimethacrylate, ethylene-oxide-modified trimethylolpropane trimethacrylate, caprolactone-modified dipentaerythritol hexaacrylate, and tricyclodecane dimethanol dimethacrylate;
   a polymer component in an amount of from 0.1 to 20 parts by weight based on 100 parts by weight of the polymerizable monomer;
   a polymeric dispersant containing no volatile organic solvent; and
   a pigment in an amount of 2.5 to 5 parts by weight based on 100 parts by weight of the polymerizable monomer,
      wherein the active energy ray curable composition is non-aqueous, and
      wherein the active energy ray curable composition has a yield value of 0.1 Pa or less either when having an initial weight or when being dried to have a weight 70% by mass of the initial weight.

2. The active energy ray composition of claim 1, wherein a content of the polymeric dispersant is equal to or greater than a saturated adsorption amount of the polymeric dispersant to the pigment.

3. The active energy ray curable composition of claim 1, wherein the polymer component has a weight average molecular weight of 100,000 or less.

4. The active energy ray curable composition of claim 1, wherein the polymerizable monomer has a stimulus index of 1.6 or less.

5. An active energy ray curable ink, comprising:
the active energy ray curable composition of claim 1.

6. An inkjet ink, comprising:
the active energy ray curable ink of claim 5.

7. A stereoscopic modeling material, comprising:
the active energy ray curable composition of claim 1.

8. An active energy ray curable composition container, comprising:
a container; and
the active energy ray curable composition of claim 1 contained in the container.

9. A two-dimensional or three-dimensional image forming apparatus, comprising:
an emitter to emit an active energy ray to the active energy ray curable composition of claim 1; and
a container to contain the active energy ray curable composition.

10. A two-dimensional or three-dimensional image forming method, comprising:
emitting an active energy ray to the active energy ray curable composition of claim 1 to cause the active energy ray composition to cure.

11. A cured product, produced by a method comprising:
emitting an active energy ray to the active energy ray curable composition of claim 1 to cause the active energy ray composition to cure.

12. A processed product, produced by a method comprising:
stretching-processing or punching-processing the cured product of claim 11.

13. The active energy ray curable composition of claim 1, wherein the photopolymerizable monomer further comprises at least one selected from the group consisting of t-butyl methacrylate, n-pentyl methacrylate, and n-hexyl methacrylate.

* * * * *